(12) United States Patent
Kain et al.

(10) Patent No.: US 12,738,812 B2
(45) Date of Patent: Sep. 15, 2026

(54) DISCHARGE DEVICE FOR DISCHARGING ELECTRICAL CURRENTS AND MACHINE COMPRISING SUCH A DISCHARGE DEVICE

(71) Applicants: Schunk Carbon Technology GmbH, Bad Goisern (AT); AUDI AG, Ingolstadt (DE)

(72) Inventors: Ludwig Kain, Bad Goisern (AT); Steffen Triebe, Manching (DE)

(73) Assignees: SCHUNK CARBON TECHNOLOGY GMBH, Bad Goisern (AT); AUDI AG, Ingolstadt (DE)

( * ) Notice: Subject to any disclaimer, the term of this patent is extended or adjusted under 35 U.S.C. 154(b) by 184 days.

(21) Appl. No.: 18/625,817

(22) Filed: Apr. 3, 2024

(65) Prior Publication Data

US 2024/0339896 A1 Oct. 10, 2024

(30) Foreign Application Priority Data

Apr. 4, 2023 (DE) ..................... 10 2023 108 650.2

(51) Int. Cl.
*H02K 9/28* (2006.01)
*H02K 9/19* (2006.01)

(52) U.S. Cl.
CPC ................. *H02K 9/28* (2013.01); *H02K 9/19* (2013.01)

(58) Field of Classification Search
CPC ...... H02K 11/40; H02K 9/28; H02K 2211/00; H01R 39/18; H01R 39/26; H01R 39/12; H01R 39/381; H01R 39/56
See application file for complete search history.

(56) References Cited

U.S. PATENT DOCUMENTS 2,821,664 A 1/1958 Weaver et al.
4,006,953 A 2/1977 Moritomo et al.
(Continued)

FOREIGN PATENT DOCUMENTS

CN 2070-82977 U 3/2018
DE 102010039847 A1 3/2012
(Continued)

OTHER PUBLICATIONS

EP-1300927-A1 Machine Translation (Year: 2003).*
(Continued)

*Primary Examiner* — Oluseye Iwarere
*Assistant Examiner* — Masoud Vaziri
(74) *Attorney, Agent, or Firm* — Quarles & Brady LLP

(57) ABSTRACT

A discharge device for discharging electrical currents from a rotor having a shaft, the discharge device including a movable contact element at least partially accommodated in a guide having a guide wall and an outer wall, the contact element being configured to form an electrically conductive sliding contact between a sliding-contact surface of the contact element and a shaft contact surface of the shaft, the sliding-contact surface being intended to form the sliding contact, the contact element being connected to the guide and/or a support element in an electrically conductive manner, preloaded in the direction of the shaft contact surface by a spring element, and at least partially wetted with an oily fluid. At least one conduit for the oily fluid is provided in the guide, the conduit ending in the outer wall or being disposed in the outer wall of the guide.

20 Claims, 4 Drawing Sheets

(56) References Cited

U.S. PATENT DOCUMENTS

| | | | | |
|---|---|---|---|---|
| 2013/0334935 | A1 | 12/2013 | Godefroy et al. | |
| 2023/0353021 | A1* | 11/2023 | Lee | H02K 5/145 |
| 2024/0055959 | A1* | 2/2024 | Zhou | H02K 7/003 |

FOREIGN PATENT DOCUMENTS

| | | | | |
|---|---|---|---|---|
| EP | 1300927 | A1 * | 4/2003 | F16C 41/002 |
| JP | 2016171642 | A | 9/2016 | |
| JP | 2017187107 | A | 10/2017 | |
| WO | 2022/135715 | A1 | 6/2022 | |
| WO | WO-2023094195 | A1 * | 6/2023 | H02K 13/003 |
| WO | 2023247441 | A1 | 12/2023 | |

OTHER PUBLICATIONS

WO-2023094195-A1 Machine Translation (Year: 2023).*

European Patent Office, Extended Search Report, Application No. 24162961.7, Sep. 24, 2024, 9 pages [English Language Translation Unavailable].

* cited by examiner

DISCHARGE DEVICE FOR DISCHARGING ELECTRICAL CURRENTS AND MACHINE COMPRISING SUCH A DISCHARGE DEVICE

The present application claims priority to German Patent Application No. 10 2023 108 650.2, filed Apr. 4, 2023, which is incorporated herein by reference in its entirety for all purposes.

The present disclosure relates to a discharge device for discharging electrical currents from a rotor part of a machine, the rotor part having a shaft, the discharge device comprising an in particular axially movable contact element at least partially accommodated in a guide and configured to form an electrically conductive sliding contact between a sliding-contact surface of the contact element and a shaft contact surface of the shaft, the sliding-contact surface being intended to form the sliding contact, the contact element being connected to the guide and/or a support element of the machine in an electrically conductive manner, and the contact element being preloaded in the direction of the shaft contact surface by means of a spring element.

Discharge devices of this kind are known in various embodiments from the prior art. In particular, it is known for carbon brushes to be used for discharging low-frequency currents, the carbon brushes being axially or radially distributed across around a shaft and in contact with a stator via connecting strands. Due to their low electrical resistance, the carbon brushes accommodated in a holding device or a brush holder enable direct discharge of electrical currents and can thus avoid undesired current conduction via bearing points of the shaft, which could cause surface damage to the bearing body or bearing rings due to spot welding or spark erosion.

The term "shaft" is used here as a synonym for the term "rotor part" or "axle". Therefore, the term "shaft" encompasses all rotating machine parts for which currents can be discharged into a fixed stator part or machine part of a machine.

Discharge devices are also regularly used in railroad technology, where alternating currents or a working current can flow via wheel axles. Such discharge devices are described in DE 10 2010 039 847 A1, for example.

Electrical machines in general, such as motor vehicles, also require measures for discharging currents. In the case of motor drive shafts or connected gear shafts or other functional components, continuously fluctuating alternating voltages or currents and high-frequency current pulses can occur, which can also damage bearing points of a rotor shaft or gear shaft, which is why discharge devices are regularly required here.

One problem with the discharge devices described and the machines having such discharge devices is the high heat development caused by electrical and mechanical losses, which leads to high thermal loads on both the discharge device and the machine (e.g., motor, transmission). In order to get this problem under control to some extent, ventilation means have often been used to remove the heat generated. However, such ventilation means can only partially minimize the thermal load on components. A further disadvantage of such ventilation means is the drastic increase in the amount of installation space required to integrate such ventilation means into the machines in question.

In order to overcome the disadvantages mentioned above, WO 2022/135715 A1 describes a discharge device in which the contact element is wetted with an oily fluid in the area of its sliding-contact surface. The oily fluid managed to reduce or dissipate the heat generated in the contact area between the contact element and the shaft. A discharge connection disclosed in the said publication presents an oil-conducting channel disposed parallel to the contact element and running in the axial direction, the oil-conducting channel feeding oily fluid into the space between the shaft and the guide, the space being bridged by the contact element. This ensures that the contact element is wetted with oily fluid in this area. One of the disadvantages of the device described is that the oily fluid is led in the space between the shaft and the guide in an axial direction only. Further cooling of the rotor is not sufficiently possible with this discharge device. Bearing lubrication or lubrication/cooling of other engine parts with the oily fluid is not possible, either.

The object of the present disclosure is to overcome the disadvantages of the prior art described above.

According to the disclosure, this object is attained by a discharge device of the type initially mentioned which is characterized in that at least one conduit for the oily fluid is provided in the guide, the conduit ending in the outer wall or being disposed in the outer wall of the guide.

With the discharge device according to the disclosure, an oil flow in a radial direction to the outside is achieved in an ideal manner. This makes it easy to achieve rotor cooling by means of oily fluid. Bearing lubrication can also be achieved by the radial oil flow. In order to achieve these advantages with the previously known discharge devices with oil routing in the axial direction, cross bores to the axial oil channel would have to be introduced into the guide. This is problematic and cumbersome in for process-related reasons.

In a particularly preferred embodiment of the discharge device according to the disclosure, the conduit for the oily fluid is a longitudinal recess in the outer wall of the guide, the longitudinal recess preferably extending from a lower end of the guide across part of the length of the guide. Such a longitudinal recess can be easily introduced into the outer circumference of the guide during manufacture.

Advantageously, the longitudinal recess is at least partially formed with an essentially U-shaped cross section, preferably in the manner of a groove. Such a U-shaped groove has proven to be particularly advantageous for oil routing.

A particularly preferred embodiment of the discharge device according to the disclosure is partially integrated in a holding device completely covering the longitudinal recess mentioned above except for one end area, in particular in a sealing manner. This creates an oil routing channel which is open on both sides and in which the oil can flow off in a radial direction through the uncovered end area of the longitudinal recess. This embodiment is illustrated in more detail in the description of the figures.

In a further embodiment of the discharge device according to the disclosure, the conduit is a channel running in the guide, the channel preferably starting at the lower end of the guide and ending in its outer wall. This channel is therefore a channel that is open on both sides but otherwise closed and runs in the wall of the guide.

A preferred embodiment of the discharge device according to the disclosure is characterized by at least one further conduit in the guide for the oily fluid, the conduit ending in an upper end face of the guide, the conduit preferably extending from a lower end of the guide, in particular a lid of the guide, to the upper end face of the guide. This channel is in particular a channel which runs parallel to the longitudinal axis of the guide and via which oily fluid is introduced into the space between the guide and the shaft, the space being bridged by the contact element. In this embodiment, oil can flow both in the axial and the radial direction.

This embodiment is particularly advantageous for cooling and lubricating a discharge device according to the disclosure as well as a machine according to the disclosure.

Advantageously, the guide is at least partially made of a low-resistance material, in particular metal, preferably aluminum, an aluminum alloy, copper and/or brass.

In a particularly preferred embodiment of the discharge device according to the disclosure, the guide can be connected to a stator part of the machine in an electrically conductive manner. This stator part of the machine can, for example, serve as a holding device for the discharge device. When the current is discharged, it is discharged from the shaft in question into the contact element and the guide of the discharge device. In the embodiment described, the discharged current then flows into the said stator part of the machine.

Advantageously, the contact element is connected to the guide in an electrically conductive manner by means of a preferably low-resistance stranded wire, the stranded wire preferably being pressed or stamped into the contact element at one end and preferably welded or soldered or crimped to the guide at the other end.

The contact element is typically a pin-shaped or bolt-shaped brush. The sliding-contact surface can be rectangular, polygonal or circular. The aforementioned brush is usually manufactured by compression molding and subsequent thermal treatment.

Advantageously, the spring element can be a helical compression spring, one end of which is preferably in contact with the end face of the contact element opposite the sliding-contact surface. With such a helical compression spring, it is possible in a simple manner to always press the contact element against the shaft with a certain desired contact pressure.

The present disclosure also relates to a machine, in particular an electric drive motor or a gear mechanism, the machine comprising a rotor part having a shaft and a discharge device according to the disclosure according to any one of claims 1 to 11, the contact element of the discharge device contacting the shaft with its sliding-contact surface to form a sliding contact. The machine according to the disclosure achieves the advantages described above of a drastically reduced thermal load while being of a small size and an uncomplicated design.

Furthermore, optimum cooling and lubrication of the entire machine is achieved.

In a particularly preferred embodiment of the machine according to the disclosure, the discharge device is held by a support element. Preferably, the discharge device is partially disposed in a support element, in which case the discharge device can be pressed into the support element. In this embodiment, a mouth of the conduit for the oily fluid in the outer wall of the guide is not covered by the support element, so that oily fluid can flow out of the conduit in a radial direction.

In a particularly preferred embodiment of the machine according to the disclosure, the conduit in the guide is a longitudinal recess, in particular a longitudinal groove in the outer wall of the guide, the longitudinal recess preferably extending from a lower end of the guide across part of the length of the guide, the support element partially covering the longitudinal recess, preferably in a sealing manner, such that the support element forms a conducting channel for the oily fluid together with the longitudinal recess. This embodiment is particularly simple to manufacture and ensures optimum conduction of the oily fluid in the radial direction with the result that the rotor, too, can be cooled and bearings can be lubricated.

In a preferred embodiment of the machine according to the disclosure, the contact element contacts an end face of the shaft, which is disposed in a recess of the shaft, at least one hole for draining oily fluid being disposed in a wall of the recess. With this embodiment, oil can flow in the radial direction from the oil conduit of the guide via the mouth of the oil line in the outer wall of the guide through the hole in the wall of the recess of the shaft.

Further features of the disclosure are apparent from the following descriptions of the figures in conjunction with the drawings and the dependent claims. The individual features can be realized alone or in combination with each other.

Hereinafter, identical or functionally identical elements are provided with the same reference signs.

Figure 1:
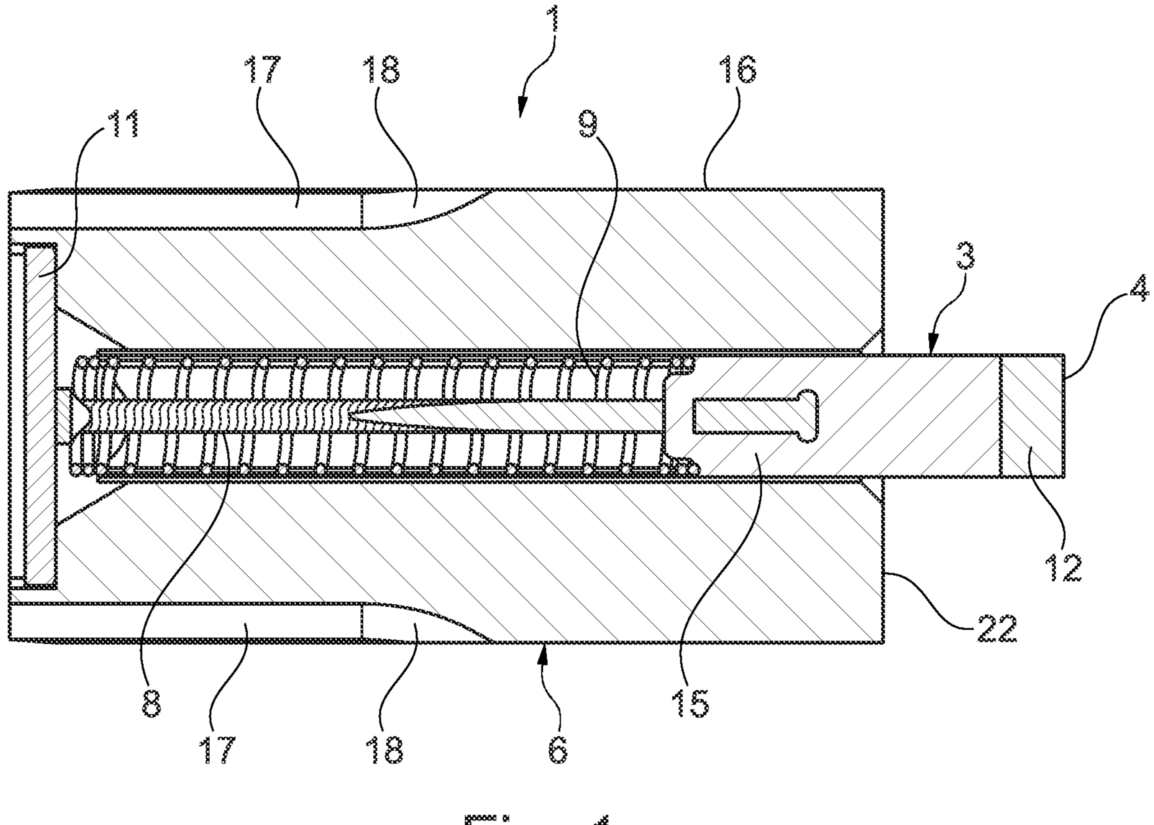
FIG. 1 is a longitudinal section view of a discharge device according to the disclosure.
Figure 2:
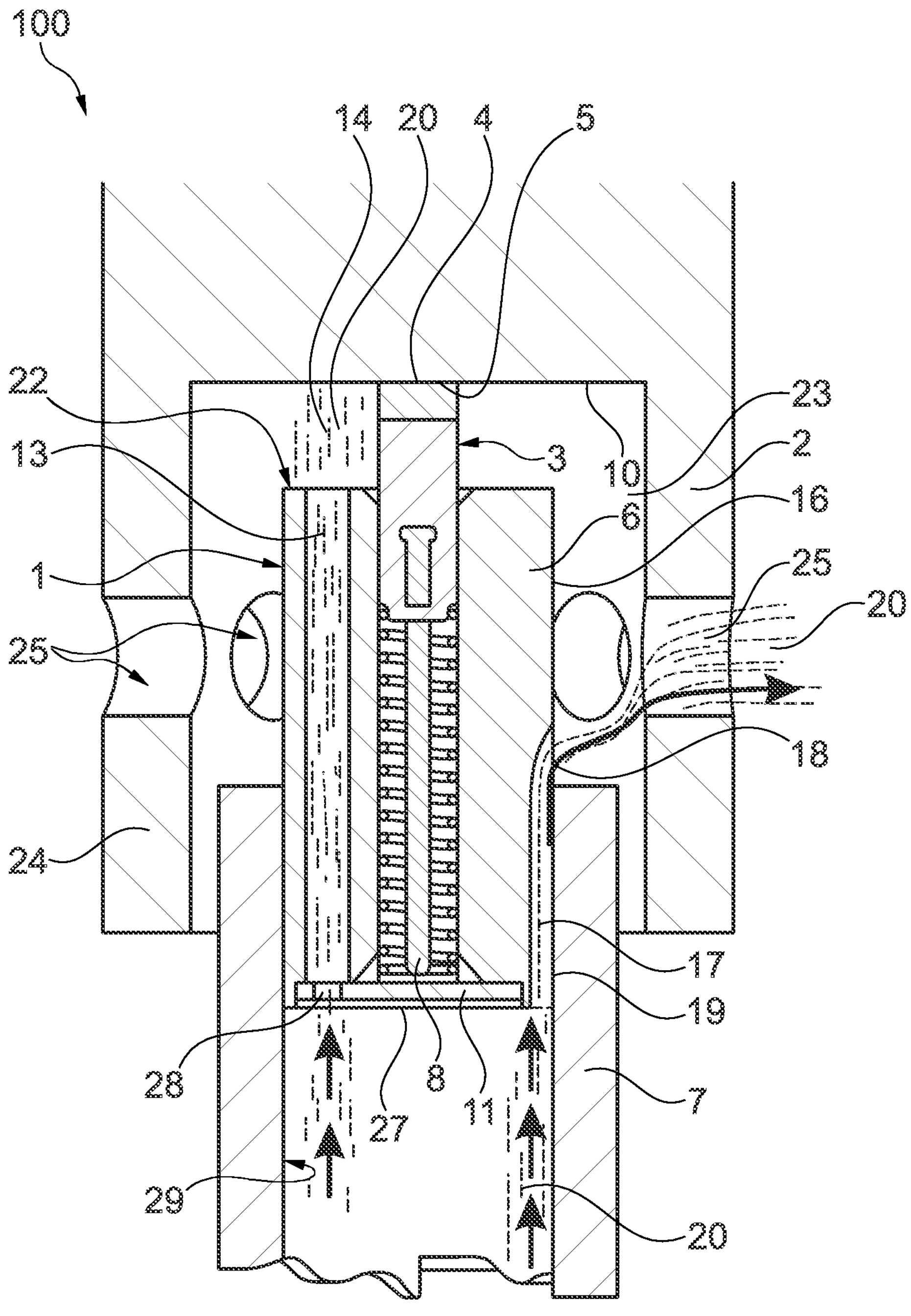
FIG. 2 is a longitudinal section view of the discharge device of FIG. 1 integrated in a machine according to the disclosure.
Figure 3:
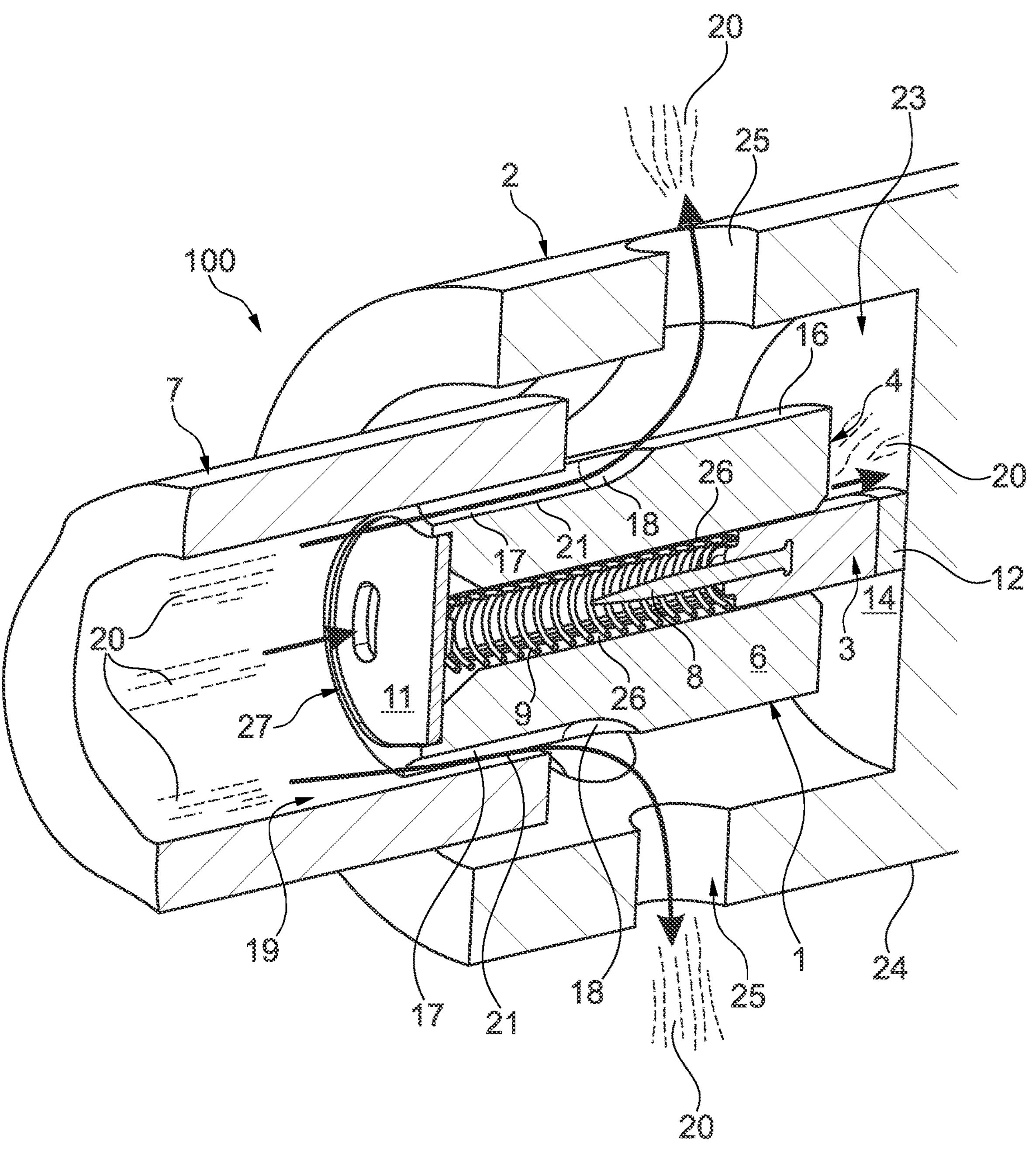
FIG. 3 is a perspective view of the discharge device and the machine of FIG. 2.
Figure 4:
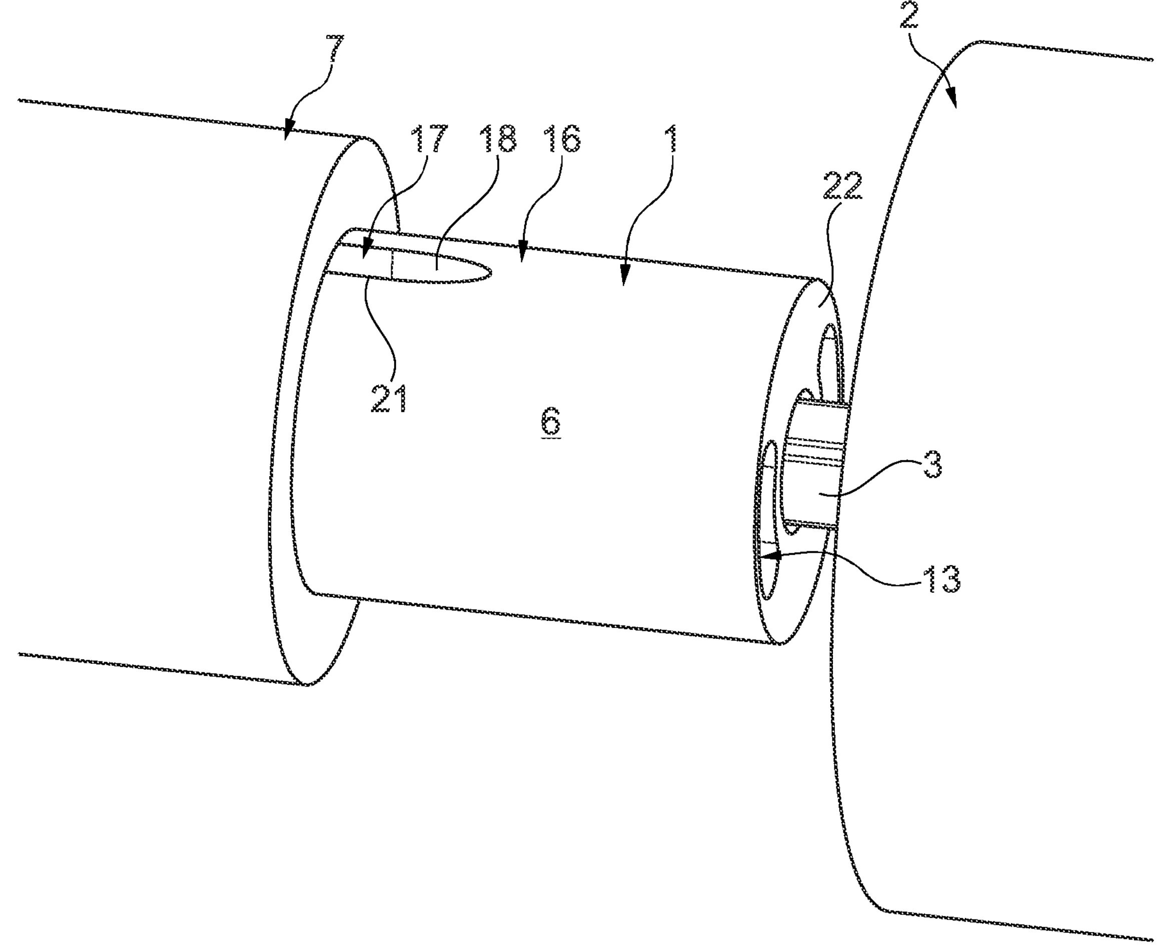
FIG. 4 is a perspective view of the discharge device and the machine according to FIG. 2.

FIG. 1 shows a longitudinal section view of a discharge device 1 according to the disclosure. A combined view of FIGS. 2 to 4 shows a section of a machine 100 according to the disclosure with a discharge device 1. In the case at hand, the machine 100 is an electric motor which has a rotor part with a shaft 2. The discharge device 1 for discharging electrical currents is disposed on an end face 10 of the shaft 2. The discharge device 1 comprises a contact element 3 in the form of a carbon brush for forming an electrically conductive sliding contact between the sliding-contact surface 4 of the contact element 3 and a shaft contact surface 5 of the shaft 2, the sliding-contact surface 4 being intended to form the sliding contact. The contact element 3 is accommodated in a guide 6, in which contact element 3 can be axially moved. The guide 6 is designed as a cylindrical housing. The guide 6 is partially integrated in a support element 7, which is also cylindrical, and is held by it. The contact element 3 is connected to the guide 6 in an electrically conductive manner by means of a stranded wire 8.

The contact element 3 is preloaded in the direction of the shaft contact surface 5 by means of a helical compression spring 9. The contact element 3 is thus subjected to a contact force by the spring 9 to form an electrically conductive sliding contact between the sliding-contact surface 4 of the contact element 3, which is intended to form the sliding contact, and the axial shaft contact surface 5 of the shaft 2. On the side of the guide 6 facing the shaft 2, the carbon brush 3 slightly out of the shaft 2 and makes contact with the shaft 2 at its end face 10. The contact element 3 is disposed essentially centrally to the end face 10 of the shaft 2 and therefore coaxially with the shaft. This position is particularly advantageous, as it minimizes wear on the contact element 3.

At the other end, the guide 6 has a lid 11 to which the stranded wire 8 is attached. The spring 9, which pretensions the contact element 3 in the direction of the shaft 2, is disposed between the lid 11 and the contact element 3.

The guide 6 is made of an electrically conductive metal, so there is an electrically conductive connection between the guide 6 and an assembly of the machine 100 that holds the guide 6. In the embodiment example at hand, the guide 6 is made of aluminum.

The stranded wire 8 is also made of a low-resistance material. The stranded wire 8 is pressed into the contact element 3 at one end and connected to the lid 11 at its other end by crimping, resistance welding or soldering. The stranded wire 8 can also be passed through the lid 11 and contacted in another manner.

The contact element 3 has a two-layer structure. In the area of the sliding-contact surface 4, the contact element 3 consists of a graphite-silver mixture. In particular, this affects a portion 12 of the contact element 3. The silver content in this area is at least 3% by volume. The remaining area of the contact element 3 consists of a graphite-copper mixture. However, portion 12 of the contact element 3 and the shaft 2 are essentially free of copper in order to avoid undesirable reactions with an oil. The contact element 3 is a cuboid pin.

A conduit 13 is formed in the guide 6, the conduit 13 extending from the lid 11 in an axial direction to a space 14 between the guide 6 and the shaft 2 and being in open connection with the space 14. As can be seen in FIG. 2, oil 20 flows from the area of the lid 11 in the direction of the space 14 and pours into it. As a result, oil 20 washes over portion 12 of the contact element 3. In a portion 15, the contact element 3 consists of a graphite-copper mixture. The stranded wire 8 is connected here to portion 15 of the contact element 3 and the guide 6 or the lid 11 and connects these elements in an electrically conductive manner.

A conduit for the oil in the form of a U-shaped longitudinal groove 17 is formed in the outer wall 16 of the guide 6. This longitudinal groove 17, which is disposed in the outer circumference of the guide 6, extends from the lower end 27 of the guide element 6, at which the lid 11 is also disposed, across approximately half the length of the guide 6. At its upper end 18, the longitudinal groove 17 has a rounded cross section. This means that the longitudinal groove 17 does not end abruptly at its upper end 18 but has a uniformly decreasing depth.

The discharge device 1 is disposed in the support element 7 in such a manner that the longitudinal groove 17 in the outer circumference 16 of the guide 6 is largely covered by the support element 7. The discharge device 1 has such a tight fit in the support element 7 that an inner wall 19 of the support element 7 makes sealing contact with the longitudinal edges 21 of the longitudinal groove 17. As a result, the support element 7 and the longitudinal groove 17 together form an oil-conducting channel open on both sides. Due to the fact that the support element 7 does not cover the upper end 18 of the longitudinal groove 17, the oil initially flowing between the inner wall 19 and the longitudinal groove 17 can flow off radially at the upper end 18 of the longitudinal groove 17. This oil flow can be easily recognized by arrows in FIGS. 2 and 3. In the embodiment example at hand, two opposing longitudinal grooves 17 are disposed in the outer wall 16 of the guide 6.

As explained above, the guide 6 has an axial oil conduit 13 in its wall. As can be clearly seen in FIGS. 2 and 3, the embodiment of a discharge device 1 according to the disclosure illustrated there allows oil to flow both in the axial direction, i.e., in the direction of the space 14 between the shaft 2 and the upper end of the guide 6, and in the radial direction. The conduit 13 extends from the lid 11, which has a corresponding recess 28, to the upper end face 22 of the guide 6, in which the conduit 13 ends. The shaft contact surface 5 of the shaft 2, which is formed by its end face, is recessed in a recess 23 of the shaft 2. Multiple holes 25 are disposed in the wall 24 around the recess 23. The oil exiting the upper end 18 of the longitudinal groove 17 can continue to flow in the radial direction through these holes 25 in order to contribute to the cooling and/or lubrication of other engine components.

The invention claimed is:

1. A discharge device for discharging electrical currents from a rotor part of a machine, the rotor part having a shaft, the discharge device comprising a movable contact element at least partially accommodated in a guide having a guide wall and an outer wall, the contact element being configured to form an electrically conductive sliding contact between a sliding-contact surface of the contact element and a shaft contact surface of the shaft, the sliding-contact surface being intended to form the sliding contact, the contact element being connected to the guide and/or a support element of the machine in an electrically conductive manner, and the contact element being preloaded in the direction of the shaft contact surface by a spring element, the contact element being at least partially wetted with an oily fluid, wherein at least one conduit for the oily fluid is provided in the guide, the conduit ending in the outer wall or being disposed in the outer wall of the guide;

wherein the conduit for the oily fluid is a longitudinal recess in the outer wall of the guide.

2. The discharge device according to claim 1, wherein at least part of the longitudinal recess is formed with an essentially U-shaped cross section in the manner of a groove.

3. The discharge device according to claim 1, wherein the discharge device is supported by a support element, the mouth of the conduit in the outer wall of the guide not being covered by the support element.

4. The discharge device according to claim 1, wherein the guide is configured to be connected to a stator part of the machine in an electrically conductive manner.

5. The discharge device according to claim 1, wherein the spring element is a helical compression spring, one end of which is in contact with the end face of the contact element opposite the sliding-contact surface.

6. The discharge device according to claim 1, wherein the longitudinal recess extends from a lower end of the guide across part of the length of the guide.

7. The discharge device according to claim 1, wherein the conduit is a channel running in the guide.

8. The discharge device according to claim 7, wherein the channel starts at the lower end of the guide and ends in its outer wall.

9. The discharge device according to claim 1, further comprising at least one further conduit for the oily fluid, the conduit being disposed in the guide and ending in an upper end face of the guide.

10. The discharge device according to claim 9, wherein the conduit extends from a lid of the guide, to the upper end face of the guide.

11. The discharge device according to claim 1, wherein at least part of the guide is made of a low-resistance material.

12. The discharge device according to claim 11, wherein the low-resistance material is metal and is an aluminum alloy, copper and/or brass.

13. The discharge device according to claim 1, wherein the contact element is connected to the guide or a support element of the machine in an electrically conductive manner by means of a low-resistance stranded wire.

14. The discharge device according to claim 13, wherein one end of the stranded wire is pressed or stamped into the contact element and the other end is welded or soldered or crimped to the guide.

15. The discharge device according to claim 1, wherein the contact element is a pin-shaped or bolt-shaped brush.

16. The discharge device according to claim 15, wherein the sliding-contact surface is rectangular, polygonal or circular.

17. A machine comprising a rotor part having a shaft and a discharge device according to claim 1, the contact element of the discharge device contacting the shaft with its sliding-contact surface to form a sliding contact.

18. The machine according to claim 17, wherein the contact element contacts an end face of the shaft, the end face being disposed in a recess of the shaft, at least one hole for draining oily fluid being disposed in a wall formed by the recess.

19. The machine according to claim 17, wherein the discharge device is supported by a support element, the mouth of the conduit in the outer wall not being covered by the support element.

20. The machine according to claim 19, wherein the conduit in the guide is a longitudinal recess in the outer wall of the guide, the support element partially covering the longitudinal recess such that the support element and the longitudinal recess together form a conducting channel for the oily fluid.

* * * * *